US 8,782,267 B2

(12) United States Patent
Gilson

(10) Patent No.: US 8,782,267 B2
(45) Date of Patent: Jul. 15, 2014

(54) METHODS, SYSTEMS, DEVICES, AND COMPUTER-READABLE MEDIA FOR DELIVERING ADDITIONAL CONTENT USING A MULTICAST STREAMING

(75) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 316 days.

(21) Appl. No.: 12/474,796

(22) Filed: May 29, 2009

(65) Prior Publication Data

US 2010/0306401 A1 Dec. 2, 2010

(51) Int. Cl.
*G06F 15/16* (2006.01)

(52) U.S. Cl.
USPC ............. 709/231; 709/203; 709/246; 725/86; 725/91; 725/102; 725/115; 725/116; 386/46; 386/68; 386/241

(58) Field of Classification Search
CPC ............ H04N 7/163; H04N 21/46315; H04N 21/2143; H04N 21/4126; H04N 21/25891; H04N 21/26603; H04N 21/4828; H04N 21/632; H04N 21/482; H04N 12/2803; H04N 12/282
USPC ............ 709/203, 231, 246; 725/118, 91, 115, 725/88, 102, 90, 94; 386/241, 68, 46
See application file for complete search history.

(56) References Cited

U.S. PATENT DOCUMENTS 6,637,027 B1 * 10/2003 Breslauer et al. ................ 725/25
7,143,433 B1 * 11/2006 Duan et al. ..................... 725/115
7,293,066 B1 * 11/2007 Day ................................ 709/213
2002/0194260 A1 * 12/2002 Headley et al. ................ 709/203
2003/0061369 A1 * 3/2003 Aksu et al. ..................... 709/231
2003/0088687 A1 * 5/2003 Begeja et al. .................. 709/231
2003/0195978 A1 * 10/2003 Fellenstein et al. ........... 709/231
2004/0187160 A1 * 9/2004 Cook et al. ....................... 725/94
2004/0268398 A1 * 12/2004 Fano et al. ....................... 725/88
2005/0216950 A1 9/2005 Macinnis
2007/0022437 A1 * 1/2007 Gerken ........................... 725/41
2007/0113264 A1 * 5/2007 Rothschild .................... 725/135
2007/0143807 A1 * 6/2007 Suneya ......................... 725/115
2007/0220566 A1 * 9/2007 Ahmad-Taylor .............. 725/89

(Continued)

FOREIGN PATENT DOCUMENTS

EP 1806919 7/2007
WO 03013138 2/2003

OTHER PUBLICATIONS

EP Application No. 10162206.6, Extended European Search Report, date May 21, 2012.

(Continued)

*Primary Examiner* — Thuong Nguyen
(74) *Attorney, Agent, or Firm* — Banner & Witcoff, Ltd.

(57) ABSTRACT

A system and method for improving media delivery and display. By utilizing a memory buffer in a DVR or similar device, and broadcasting linear content at a rate other than 1×, services like video on demand or regular broadcasters can be more versatile. For example viewers can start over without launching a separate VOD session. If part of the linear content requested is not in the buffer, a switched multicast stream can be sent to with the proper section of content. Other receivers on the network may also receive the stream and buffer the content if the content is related to what a viewer is viewing.

21 Claims, 8 Drawing Sheets

(56) References Cited

U.S. PATENT DOCUMENTS

2008/0086754 A1* 4/2008 Chen et al. .................. 725/105
2008/0098101 A1* 4/2008 Black et al. .................. 709/223
2009/0031007 A1* 1/2009 Boic et al. .................... 709/219
2009/0202221 A1* 8/2009 Guo et al. ...................... 386/68
2009/0292819 A1* 11/2009 Kandekar et al. ............ 709/231
2010/0158101 A1* 6/2010 Wu et al. .................. 375/240.01
2010/0303440 A1* 12/2010 Lin et al. ...................... 386/241

OTHER PUBLICATIONS

EP Application No. 10162206.6, Partial European Search Report, dated Jan. 16, 2012.

* cited by examiner

METHODS, SYSTEMS, DEVICES, AND COMPUTER-READABLE MEDIA FOR DELIVERING ADDITIONAL CONTENT USING A MULTICAST STREAMING

FIELD OF THE DISCLOSURE

The features disclosed herein relate generally to broadcast media. More specifically, aspects of the disclosure are directed towards systems and methods for enhanced media streaming.

BACKGROUND

Current broadcast and streaming video and media systems offer many features to viewers. Digital Video Recorders (DVRs) allow viewers to record and replay live broadcasts. However, viewers watching a live video stream cannot rewind the video stream past where they tuned into it, and also cannot fast forward the video stream, unless they have paused it, and then they can only catch up to the live video stream.

A similar problem exists for video on demand (VOD) viewers. VOD allows viewers to modify playback (referred to as "trick play") such as pause, rewind, fast forward., etc.). VOD features tend to have high latency when entering and exiting trick play modes.

Further, conventional near VOD and/or television suffers from limitations when someone wants to "start-over" or rewind a program to see content that was broadcast prior to when they tuned into it. The current near VOD infrastructure can not support more than a few hundred VOD streams. If a separate unicast VOD stream was to be used to solve these problems, the system would not be practical on current systems. For example, if popular content like major sporting events or speeches allowed "start-over" VOD sessions, the system would become overloaded in a short period of time.

Unicast VOD sessions take up a large amount of bandwidth for a single viewer, and they have high latency when entering and exiting trick play modes. Further, it is not possible to fast forward past the current "live" position of linear broadcast feeds.

SUMMARY

The following presents a simplified summary of the disclosed features in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Some embodiments of the disclosure provide enhanced viewer playback options for streamed video and other media. Multiple fast forward and rewind variations, as well as other features may be available. By utilizing buffer (e.g., a media content storage buffer such as a hard drive buffer on a DVR), and broadcasting the media content faster than the playback speed, users can "start-over" without necessarily launching a separate VOD session. For example, aspects of the present disclosure mask latency and delay as well as avoid the need for many overlapping unicast streams by repeatedly broadcasting and buffering overlapping content. Many users may be classified as channel surfing users. These users browse many channels until they find a program they are interested in viewing. The user then wants to tune back in time to watch the program from the beginning. For popular programs, this can create an enormous drain on system resources. This drain may be avoided and any latency problems masked by multicasting the original content in a non-linear fashion. If part of the linear content requested is not in the buffer, a switched multicast stream can be received by anyone needing that section of content. Where a QAM modulation technique is employed, multiple segments of the show can be simulcast on the same QAM channel, which may include many program streams. Where these segments are broadcast non-linearly, the user can advantageously start from the beginning of the show and all latency can be masked. For example, as the user is watching the program, the program guide or channel surf guide may initially indicate a red bar at the start of the program indicating that the user may not rewind to the start of the program. However, after a brief interval when the non-linear content has downloaded, the user may then be shown a green bar at the start of the program guide or surf guide indicating that the user may rewind to the beginning of the show and watch from the beginning.

Further, the user can then hit the record button and the show may be recorded from the beginning. Two or more program streams for the same program may be recorded simultaneously. Further, media content may be streamed at speeds faster than 1× either on the same program stream or over multiple program streams.

Some embodiments may include a method of receiving video or media content streamed over a transmission network. The method may include simultaneously receiving the streamed media content while providing the streamed media content for viewing at a playback rate. Further, the method may, upon receiving a request to change playback of the streamed media content to a different playback point, implement one or more of the following steps:
 a. determining if media content for the different playback point is available in a buffer storing media content (e.g., a local media content storage buffer);
 b. transmitting a request over the transmission network for additional media content for the different playback point if, for example, the media content for the different playback point is not available in the buffer;
 c. receiving a multimedia transmission (e.g., a video or audio multicast stream) including the additional media content over the transmission network;
 d. receiving additional media content at a rate higher than the playback rate for the media content; and
 e. storing the additional media content locally, for example, in the local media content storage buffer.

Alternatively, the method may, either automatically or upon receiving a request to play media from a different playback point, perform a method with one or more of the following steps:
 a. receiving information (e.g., in a second multicast stream) including additional media content irrespective of whether or not a request was transmitted over the transmission network;
 b. determining if the additional media content is related to the media content being viewed;
 c. if the additional media content is not in the local media content storage buffer, then receiving the additional media content (e.g., via second multicast stream), and storing the additional media content in the local media content storage buffer; and
 d. in alternate embodiments, storing the additional media content regardless of whether or not the user has initiated a request to play the media from a different playback point.

The media content streamed over a transmission network may be streamed at a rate greater than a playback rate, and the method may include storing the media content in the local media content storage buffer. Receiving media content (e.g., via streaming) over a transmission network may include receiving the media content in a plurality of transmissions (e.g., different content streams), each of the transmissions providing a different segment of the media content.

Some embodiments may include an apparatus which may be configured to include a buffer for storing media content locally, one or more processors, one or more network interfaces for a transmission network, one or more memories, and one or more output ports (e.g., a HDTV or monitor output port). The memory may include executable instructions, that when provided to the processor, cause the apparatus to perform receiving media content (e.g., streamed media content) through the network interfaces including any of the following functions:

a. determining if media content for the different playback point is available in the buffer;
 b. transmitting a request over the transmission network for additional media content for the different playback point if, for example, the media content for the different playback point is not available in the buffer;
 c. receiving a multimedia transmission (e.g., a video or audio multicast stream) including the additional media content over the transmission network;
 d. receiving additional media content at a rate higher than the playback rate for the media content; and
 e. storing the additional media content locally, for example, in the buffer.

Alternatively, the memory in the apparatus may include instructions which, when implemented in the processor, perform one or more of the following steps:

e. receiving information (e.g., in a second multicast stream) including additional media content irrespective of whether or not a request was transmitted over the transmission network;
 f. determining if the additional media content is related to the media content being viewed;
 g. if the additional media content is not in the buffer, then receiving the additional media content (e.g., via second multicast stream), and storing the additional media content in the buffer; and
 h. in alternate embodiments, storing the additional media content regardless of whether or not the user has initiated a request to play the media from a different playback point.

Some embodiments may include a method for delivering a multicast stream. In exemplary embodiments, the steps of the method may include:

a. requesting streaming media content over a transmission network;
 b. receiving a related portion of the media content, different from the media content being presently streamed, the related media content portion being received as part of a multicast stream over the transmission network.

The method may further include utilization of the multicast stream by a plurality of receiving units. This step may additionally include at least one of the receiving units utilizing the related media content portion to change a playback point in the streamed media content.

In still further embodiments, the method may include receiving streaming media content on more than one media stream (either successively or simultaneously) from a transmission network at a rate higher than a playback rate. The method may also include receiving a first linear portion of the media content on a first content stream, and simultaneously receiving a second linear portion of the media content on a second content stream. Exemplary embodiments of this method include receiving a media stream where a beginning point of the second linear portion of the media content about matches an end point of the first linear portion of the media content.

Further, the method may include streaming a first linear portion of the media content on a first content stream, and simultaneously streaming a second linear portion of the media content on a second content stream. Alternatively, the method may include streaming the first portion of the media content on the first content stream and then streaming the second portion of the media content on the first content stream. Additionally, the method may also include streaming the second portion of the media content on the second content stream, then streaming the first portion of the media content on the second content stream.

a. Some embodiments may include an apparatus which may be configured to include a buffer for storing media content locally, one or more processors, one or more network interfaces for a transmission network, one or more memories, and one or more output ports (e.g., a HDTV or monitor output port). The memory may include executable instructions, that when provided to the processor, cause the apparatus to perform receiving media content (e.g., streamed media content) through the network interfaces including performing one or more of the following functions: requesting streaming media content through at least one network interface;
 b. receiving a related portion of the media content, different from the media content being presently streamed, the related media content portion being received as part of a multicast stream through the network interface.

The apparatus may further include instructions for receiving through the network a multicast stream that is adapted for utilization by a plurality of receiving units. The apparatus may utilize the related media content portion to change a playback point in the streamed media content.

In still further embodiments, the apparatus may include instructions which, when executed, cause the microprocessor to coordinate receiving streaming media content on more than one media stream (either successively or simultaneously) from the network interface at a rate higher than a playback rate. The apparatus may also include instructions for receiving a first linear portion of the media content on a first content stream through the network interface, and simultaneously receiving a second linear portion of the media content on a second content stream through the same or a different network interface. Exemplary embodiments of this apparatus include instruction which, when executed, cause the network interface to receive a media stream where a beginning point of the second linear portion of the media content about matches an end point of the first linear portion of the media content.

Further, the apparatus may include instructions which, when executed, cause the network interface to receive a first linear portion of the streaming media content on a first content stream, while simultaneously receiving a second linear portion of the steaming media content on a second content stream. Alternatively, the apparatus may include instructions which, when executed, cause the network interface to receive a first portion of the streaming media content on the first content stream and then receiving the second portion of the streaming media content on the first content stream. Additionally, the apparatus may include instructions which, when executed, cause the network interface to receive the second portion of the streaming media content on the second content stream, and then receive the first portion of the media content on the second content stream.

While the present summary of the disclosure talks in terms of the termination device, the invention is not limited to the termination device. The invention includes the systems and methods associated with the network and with the central system supplying the media content such as a "headend" or Internet Server location. For example, each of the above summarizes of the invention may be restated in terms of 1) the network transporting the streams, 2) the headend or Internet server or other central location generating the streams, and 3) the overall system supplying the streams over the network to the termination devices. These aspects will be dealt with in the claims below and are not repeated here for brevity.

Aspects of the present disclosure allow a network interface device to provide more features and a significantly enhanced user experience without unnecessarily limiting the number of users by requiring numerous unicast streams to individual users interface device. Further, the system is highly scalable and provides significant cost savings to the network provider.

BRIEF DESCRIPTION OF THE DRAWINGS

A more complete understanding of the disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments. It is to be understood that other embodiments may be utilized and structural and functional modifications may be made without departing from the scope of the disclosure.

Figure 1:
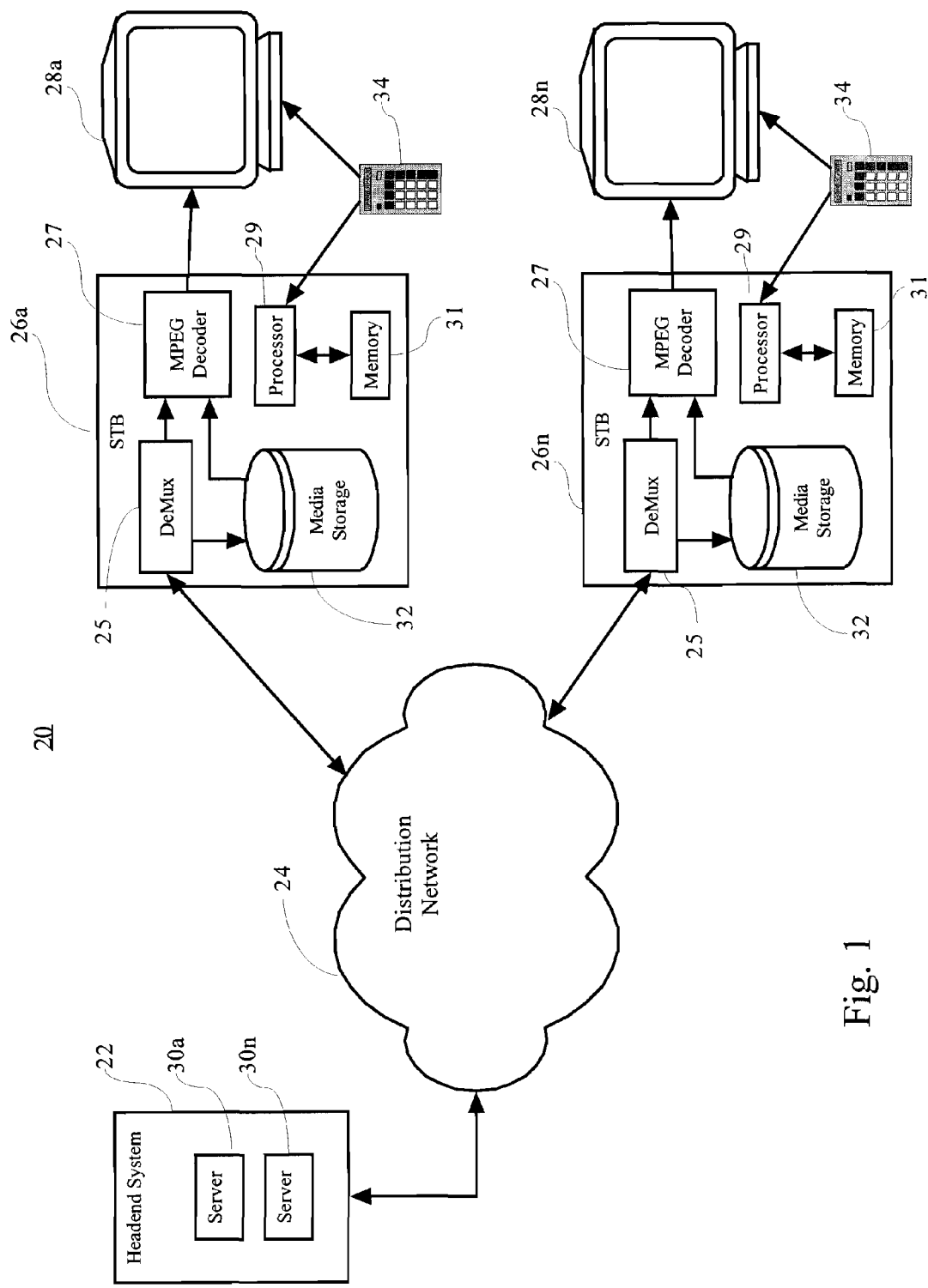
FIG. 1 illustrates one embodiment of a media broadcast distribution and delivery system.

FIG. 1 illustrates a media stream processing and distribution system 20 that may be utilized by embodiments of the disclosure. The distribution system 20 generally comprises one or more central system(s) 22 which may include one or more servers and be configured as a headend and/or a web site and/or ftp site and/or a satellite hub and/or a telephone switching center, one or more networks such as network 24, at least one interface device 26 such as a personal computer and/or set top box (STB), and/or satellite receiver, and/or wireless receiver such as a smart phone or wimax device (generally a plurality of interface devices 26a-26n), and at least one display device 28 such as a monitor or television (generally a plurality of display devices either associated with one interface device or different interface devices 28a-28n). In some embodiments, the interface device and the display device may be integrated into the same unit. The devices may also have one or more remote controls 34 associated with the interface device 26 and/or display device 28. The distribution system 20 is generally implemented as a media service system wherein the provider (or vendor) generally operates the central system 22 and the network 24, and also may provide a user (e.g., a subscriber, a client, a customer, a service purchaser, an end user, etc.) with the interface device 26. Alternatively, the distribution system 20 may be implemented over a network such as the internet, a wireless network, and/or a satellite network.

The interface device 26 is generally located at the end user location (e.g., home, tavern, hotel room, business, etc.). In cable, telephone, and satellite systems, the interface device 26 is generally provided by the cable/satellite/telephone system but may alternatively be purchased and provided by the end user. In these systems, these devices are typically called set-top boxes, network interface units, and/or cable cards. In many cases, the display device 28 is generally provided by the end user. The display device 28 and/or interface device 26 may be a television, high definition television (HDTV), monitor, host viewing device, MP3 player, audio receiver, telephone, PDA, smart phone, tablet, radio, personal computer, media player, digital video recorder, game playing device, etc. The display device 28 may be implemented as a transceiver having interactive capability in connection with the interface device 26, the central system 22, or both the interface device 26 and the central system 22. Alternatively, as discussed above, the interface device and the display device may be integrated into the same device.

Figure 9:
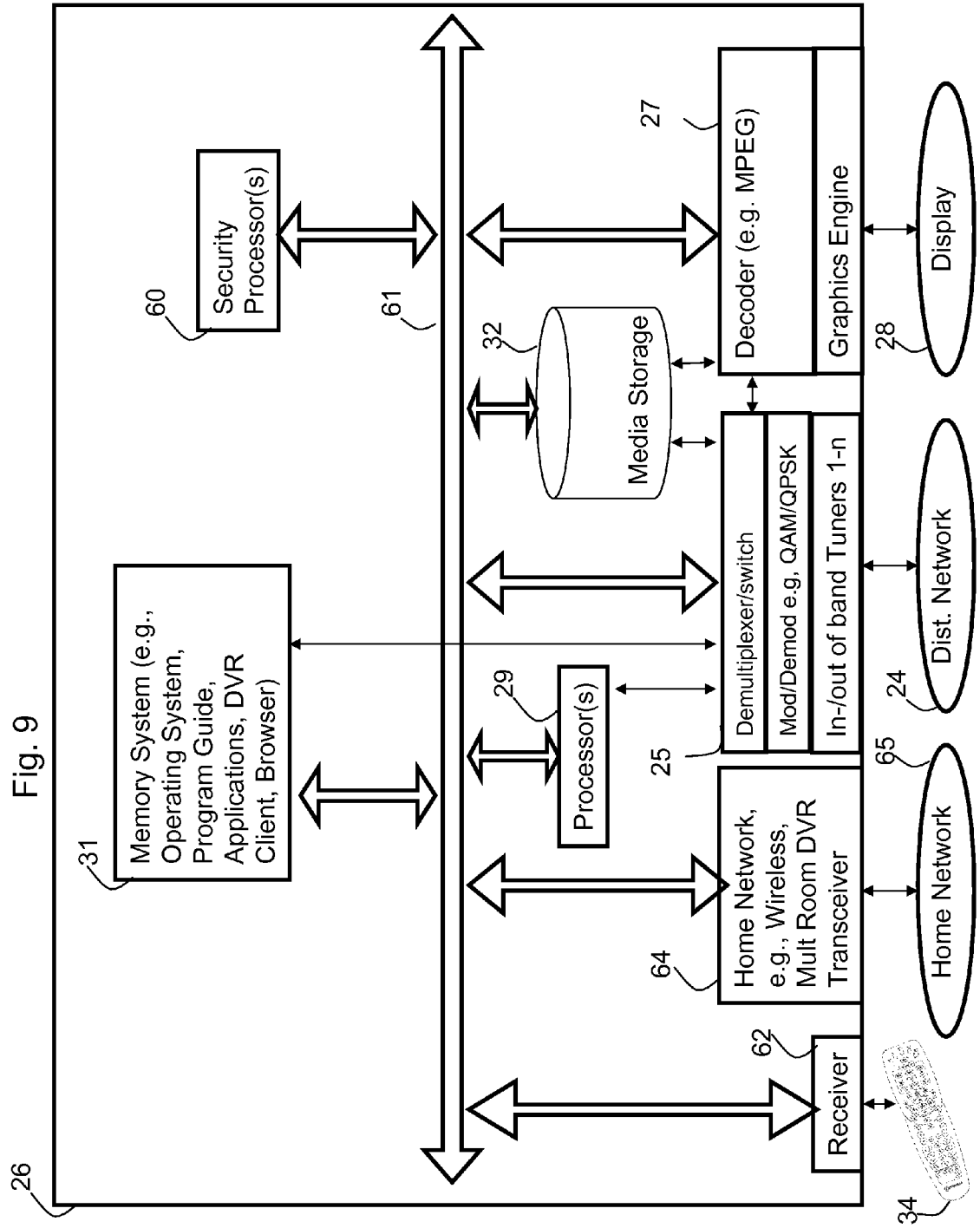
FIG. 9 shows a more detailed block diagram of the interface device 26.

FIG. 9 shows a more detailed block diagram of the interface device 26. In this exemplary embodiment, the one or more processor(s) 29 and memories 31 may interface with other devices in the interface device 26 by virtue of the bus 61. For example, the processor(s) may interface with the remote control 34 via a receiver 62. The remote control may also communicate directly with the display device 28. The processor(s) 29 may interface with a home network 65 via a home network interface 64. The home network interface may be variously configured to support a wireless connection to a home network, the internet, and/or a multi-room DVR interface. The processor(s) 29 may also be coupled to a distribution network interface unit 25 which may be configured to include one or more tuners (preferably three or more), QAM and/or QPSK modulators/demodulators, in-band and out-of-band signaling interfaces and demultiplexers. The network interface unit 25 may also include a data switch for routing data to the processor(s) 29, to the memory subsystem (31), the system bus 61, the media storage 32, and/or the decoder system (e.g., a MPEG decoder). The network interface unit 25 may be implemented as an application specific integrated circuit. The Decoder system/graphics engine 27 includes a decoder for decompressing and/or decoding a multimedia stream and outputting the stream to a display 28. One or more security processor(s) 60 are also included for ensuring that the video may be securely received and stored.

The central system 22 is generally coupled through the network 24 to the interface device 26 and/or display device 28. The coupling may be implemented as any appropriate hard-wired (e.g., twisted pair, untwisted conductors, coaxial cable, fiber optic cable, hybrid fiber cable, etc.) or wireless (e.g., radio frequency, microwave, Ku or Ka band, infrared, etc.) coupling and protocol to meet the design criteria of a particular application. While the distribution system 20 is illustrated showing one interface device 26 coupled to a respective one device 28, each interface device 26 may be implemented having the capability of coupling more than one display device 28 (not shown). The central system 22 may include one or more servers 30. In alternate embodiments, the central system may also include amplifiers, pre-amplifiers, data servers, computers, processors, security encryption and decryption apparatuses or systems, and other devices configured to transmit or stream media (including video and/or audio) over a network 24.

Figure 10:
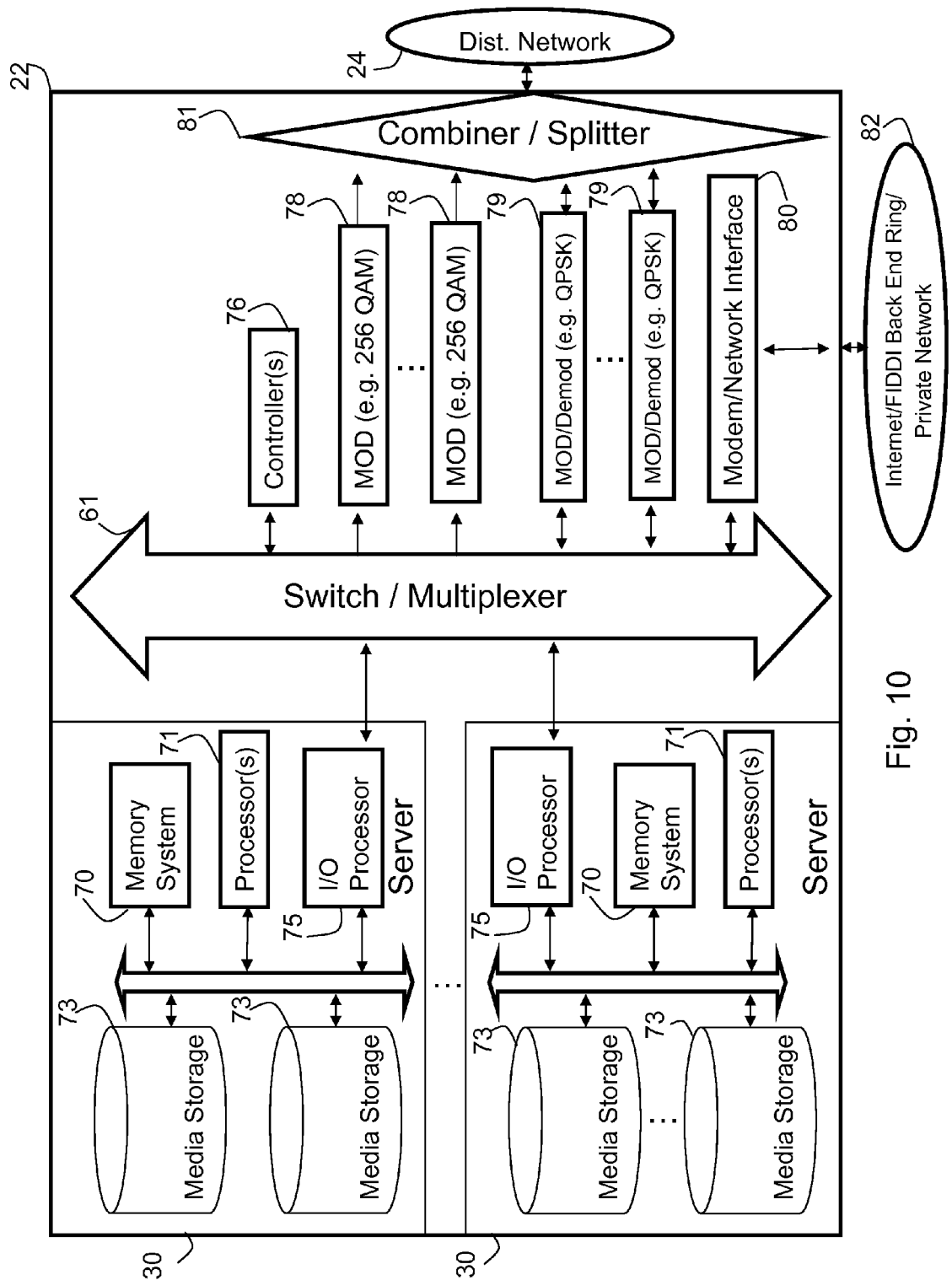
FIG. 10 show a more detailed block diagram of the central system 22.

FIG. 10 shows an exemplary central system 22. In this embodiment, a plurality of servers 30 are coupled via a switch/multiplexer 61 to a plurality of modulators/demodulators (e.g., QAM units 78, QPSK units 79) and a combiner splitter 81 to the distribution network 24. The servers may each comprise media storage 73 for storing multimedia including programs, a memory such as memory system 70, one or more processors 71, and an I/O processor 75 for controllably outputting media streams. The switch/multiplexer 61 may be programmed directly and/or controlled via centralized network controller(s) 76. The central system may also receive media from the Internet, a FIDDI back end ring, and/or a private network 82 via a modem/network interface unit 80.

The network 24 may be variously configured. In one exemplary embodiment, it may be configured as a media stream distribution network (e.g., cable, satellite, etc.) to selectively distribute (e.g., transmit and/or receive) media service provider streams (e.g., standard broadcast television, radio, digital television, HDTV, audio, MP3, text messaging, and/or games, etc.) to the interface devices 26 and/or the receivers 28. These streams may generally be distributed based upon (or in response to) requests from the interface device which may be initiated directly or indirectly by actions of the users. For example, in a subscriber system, this may be determined by the level of service the client has purchased (e.g., basic service, premium movie channels, etc.), the type of service the client has requested (e.g., standard TV, HDTV, interactive messaging, video on demand, pay-per-view, impulse-pay-per-view, etc.), and other factors which may be used to determine the media streams that are sent to and/or received from a particular user.

For certain legacy systems such as cable television head-end systems, Digital video and/or media is often overlaid over the convention 6 MHz analog transmission bandwidths which conventionally corresponded to the bandwidth of a 6 MHz analog television channel. To remain backward compatible, digital data (e.g., one or more MPEG streams) was overlaid on the same 6 MHz bandwidths that were previously occupied by a single analog television channel. The type of modulation and resolution of the picture (standard or high definition) impacts the number of digital channels that may be carried over standard 6 Mhz bandwidths. For example, many digital television systems over a cable/fiber architecture utilize some form of quadrature amplitude modulation (either QAM either 64 QAM or 256 QAM). For these types of systems, the QAM device may reside in the central system and interface to the network 24. One QAM at the current common modulation (256 QAM) can stream ~38 mbit/sec of data. Multiple video streams may be encoded in an MPEG transport stream and output through each QAM, for example 10-12 standard definition video streams, or 2-3 high definition video streams. The central system 22 may incorporate hundreds of QAM devices. Each video stream is typically identified by a different program number so it can be individually displayed. The interface device 25 receives all 38 mbit of data, but only displays the selected channel even though other channels and/or data streams are distributed within that particular QAM. Many television content suppliers are moving away from the 6 MHz bandwidth constraints imposed by legacy systems as they convert entirely to digital systems. For example, the bandwidth of each QAM device can increase to tens or even hundreds of MHz. Further, the delay associated with tuning a tuning device to each QAM channel may be avoided as the size of the QAM channels increase. Additionally, multiple redundant data streams and/or multiple redundant tuners and/or large caching media storage devices may be utilized to cache large amounts of data sent over one or more QAM channels. This improved design of the modulation devices and/or interface device 26 can be advantageously used to provide an significantly enhanced user experience. This enhanced user experience may correspond to an add-on package that the cable operator may charge the end user to receive, e.g., $10/month.

For example, the user may surf through channels at any time during the day, not necessarily just at the top of the hour or half hour. As a practical matter, it is almost impossible to surf through all of the hundreds of channels "at the top of the hour" to select a program without missing the start of at least some programs. Once a user settles on a program he or she wishes to watch, the user often has missed the first few minutes of the program. Aspects of the present disclosure allow the start of the programs to be cached either initially or as part of a redundant transmission. Thus, the user may "start over" the program even though in liner time, he or she has already missed the start of the program. In this manner, the user may begin watching a program at any arbitrary entry point, and then simply select to start over the program from the beginning.

Figure 11:
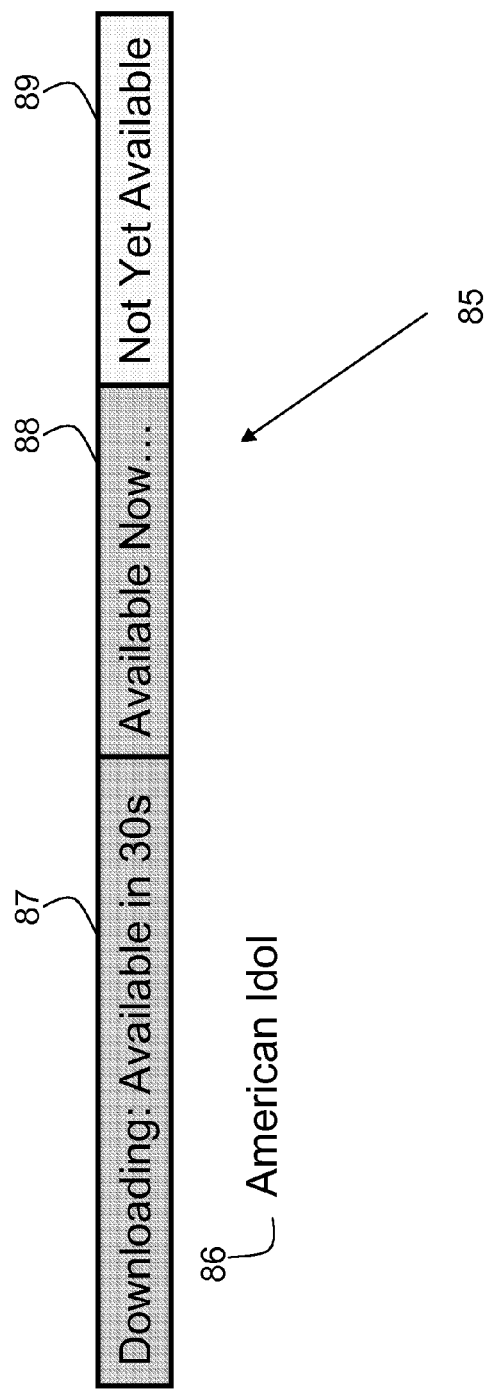
FIG. 11 shows a channel banner bar employing aspects of the present disclosure.

FIG. 11 shows a banner guide (program progress bar) as modified for use with the present invention. Referring to FIG. 11, the portion in red 87 shows the how a user cannot view past programming where the device was not previously "tuned" to the channel when the program started. Conventionally, this problem was often made worse when the user "tunes" away from the channel for some reason (e.g., boredom, commercial break, an embarrassing scene in the program, during violence, during a sex scene, etc.) and then returns to the program. In this case, conventionally, the red bar is advanced to the point where the user retuned to the program. If the user did not time the commercial break or scene correctly, he or she cannot simply rewind the program. A user often naturally wants to rewind the program all the way to the beginning and certainly wants to be able to return to just before the commercial break ended. Conventionally, this has not been possible. Using embodiments of the present disclosure, this inconvenience to the user is avoided. In the embodiments employing a caching tuner to predict the channels of interest to the user, the shows are stored in the media storage 32 while the user has tuned away during, for example, a commercial break. At any given time, a user usually watches less than three programs. Most modern settop boxes, for example, already include three to four tuners. The separate tuners, when not used for recording multiple programs, may be used to improve the user experience in accordance with the present disclosure. Further, the cost of the tuners has fallen to the point where it is practical to include numerous tuners in a single interface device 26. In this case, by using past viewing preferences over the last few minutes, the processor 29 in the interface device may predict the programs the user is likely to tune to during commercial breaks and cache the media streams for those programs in anticipation of the user tuning to these programs.

In some embodiments of the disclosure which employ multiple streams or streams downloaded faster than the program, the red bar appears only temporarily until the remainder of the program is downloaded. In these embodiments, the length of the red bar may decrease to zero length after a short period of time when the alternate program stream in downloaded. The red bar portion of the banner bar (program progress bar) may show an indication of the amount of time before the full program will be available for viewing and/or recording. Referring to FIG. 11, the red portion 87 indicates that the past portions of the program are downloading and will be available in 30 seconds. The green portion of the progress bar labeled as 88 shows the portion of the program that is currently available in the media storage for trick play modes. The portion of the banner bar shown in yellow 89 shows the portion of the program not yet broadcast. In addition to rewinding the program, the user may at any time select to record the entire program. Thus, using embodiments of the present disclosure, either the red bar is non-existent such as where the interface device may input the entire digital programming feeds (e.g., 5 100 MHz QAM channels and 5 tuners) together with the appropriate caching circuitry or where there is redundant non-linear programming feeds where selected channels may be cached from the beginning where it is determined the user has shown an interest in the channel.

While one exemplary example of an interface device 26 for accomplishing these functions is described herein, aspects of the disclosure are not limited to this implementation. For example, in one exemplary implementation, interface device 26 may include a demultiplexer 25, which can take an encoded transport stream (e.g., MPEG) and separate out the selected video stream(s). Where the encoded transport stream includes 7, 12, 24, 48, 64, 96, 128, and/or 256 different program streams, the demultiplexer 25 may be configured to separate out one or more desired programs and send those programs through one or more decoders (e.g., a MPEG decoder) to one or more display devices 28. For example, in one exemplary embodiment, the most commonly watched programs (e.g., those with the highest ratings) may be grouped on a single QAM channel. In this manner, these programs may be continuously cached (e.g., in media storage 32) and the user can switch between them and channel surf back and forth between channels and back and forth in time. This two dimensional channel surfing allows the user much more freedom and enhances the user experience. Additionally, by using multiple MPEG decoders and/or adaptive and predictive software in the processor 29 to anticipate the next channel, the user may simply switch between decoding devices in decoder 27 and hence any perceived delays in changing the channel by the user are avoided. In this manner, the user gets instantaneous response to changing the channel and once on the channel can navigate back and forth in time. The device can also view program identification numbers (PIDs) or other tagging mechanisms to determine when a program starts and stops. Additionally, the device may cache programs while the device is turned off. In this manner, the user experience is enhanced since the programs are ready when the user is ready to view the programs. The demultiplexer 25 may output several video streams simultaneously from the transport stream. The interface device 26 generally comprises at least one respective media decoder 27, which will typically be an MPEG (motion pictures expert group) decoder, which may be utilized to decompress the selected video stream and provides uncompressed analog or digital video output for the viewing device 28. Many interface devices available today include multiple tuners/decoders 27, allowing the interface device 26 to tune to and/or decode more than one stream at a time. This allows features such as picture-within a picture (PIP) viewing features, for example. The interface device 26 may also include VOD (video on demand) features, as will be described below.

Where the interface device 26 includes a media buffer and/or storage 32, which may be configurable for storing one or more video streams received by the interface device 26, the storage device may be variously configured. For example, the storage 32 may comprise one or more hard disks, solid state storage devices, and/or other storage devices. Interface devices 26 equipped with such storage devices are often known as digital video recorders (DVRs). The storage 32 may be any type of storage device, for example hard disk drive, optical drive, volatile or non-volatile memory, sold state memory, flash memory, etc. The interface device 26 may allow video streams extracted by the demultiplexer 25 to go to either the storage 32, or the decoder 27, and/or to both. The media storage device 32 may be able to simultaneously store one or more video streams received from the demultiplexer 25, and also to play out video to the decoder 27 for display by the receiver 28. The decoder 27 may dynamically switch between receiving and decoding (live) video from the demultiplexer 25, and (stored) video from the media storage 32. The interface device 26 may also include a processor 29, to control the components of the interface device 26 and provide processing for various activities. The processor 31 may receive and interpret user commands, for example, from a remote 34. The interface device 26 may also include memory 31, which may be in the form of volatile or non-volatile memory, and may help provide buffering as well as containing machine executable instructions for the processor 31 to execute.

Figure 2:
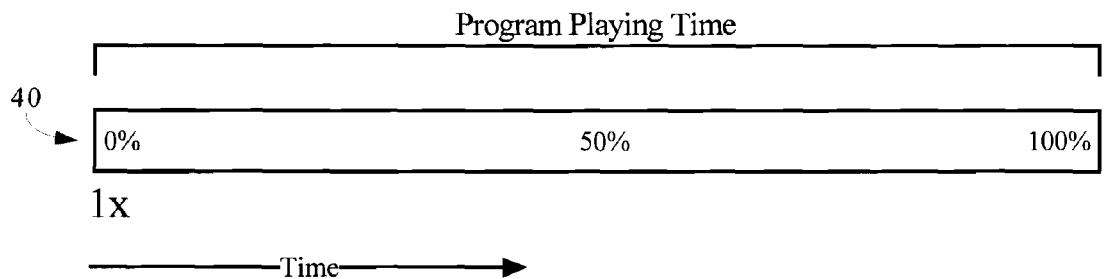
FIGS. 2-7 illustrate various embodiments of the media delivery stream which may be used independently or in combination.

In one exemplary embodiment, where the caching storage and QAM bandwidth may have certain constraints, it may be desirable to utilize redundant non-linear transmission to enhance the user transmission. FIG. 2 illustrates a program video stream sent in real time at regular speed (1×). Basically, the program video is streamed at the rate it is viewed, therefore an hour-long video program will be streamed for one hour. As will be discussed below, embodiments of the disclosure include sending video data at speeds and rates other than 1× speed to help enhance the user experience.

In a Video on Demand (VOD) system, a viewer may select specific video content, such as by using a remote control 34, to request the commencement of streaming of the selected video content from the central system 22. Commands to pause, rewind, fast forward, etc. (often referred to as "trick play") may be transmitted from the viewer back to the central system, for example, which will change the streaming accordingly. In typical current systems, if a viewer wants to fast forward, the viewer presses the button on a remote control 34, which sends a signal to the interface device 26 and a command is sent upstream to the VOD servers 30 in the central system 22, which switch the video being streamed to the viewer to a special trick play linear video. For fast forward, content showing video being fast forwarded is streamed at the usual 1× speed. The viewer's interface device treats the fast forward video no differently than normal playback. Then when the viewer wishes to play the video again at normal speed, the process switches back to normal speed video. This causes excessive latency for every button press, and limits the speed of fast forward and rewind normally to 2× speed.

Traditional VOD sessions take up one video stream in the QAM for the entire time the viewer is watching the content. As shown in FIG. 2, the VOD stream 40 is still streamed at regular speed. If a viewer on a current system rewinds the content, or even pauses it, the viewer wastes bandwidth. If a viewer is watching a two hour movie, but pauses and/or rewinds it so that the viewing time is longer than 2 hours, more bandwidth is consumed than if the video was streamed to the viewer at a higher speed and then buffered. For example, if a VOD movie was only 2 hours long, the viewer might take three hours to watch it because of interruptions for pausing, rewinds, multiple viewings of a same scene etc. If the content was 3 mbit/sec, and the traditional VOD stream was open for 3 hours, then a total of 32.4 gigabits of data may be transmitted (3 hours*60 minutes*60 seconds*3 mbit=32400 mbit).

By utilizing the media storage 32 buffer in an interface device 26 or DVR box, and broadcasting the linear media content faster than 1× (the speed it takes to watch the content), some embodiments disclosed herein provide for several improvements. One advantage is that bandwidth can be saved. For example, the 3 mbit/sec video may be sent at 6 mbit/sec speeds, which would only require half the running time of the video, and only 21.6 gigabits. (1 hour*60 minutes*60 seconds*6 mbit=21600 mbit).

In current systems, a viewer watching the same VOD resource X times, uses X times as much bandwidth as watching once would use. However by buffering the content in accordance to one or more embodiments, no extra bandwidth is needed for the second showing. While this is a drastic example, any savings of bandwidth can be advantageous.

Some embodiments may provide several advantages, including increased utility and satisfaction for viewers. For example, a viewer may access the video content in a similar manner to a stored DVR recording. Viewers may be able to "start-over" without launching a separate VOD session, and may also be able to perform other playback manipulation features, such as pause, fast forward, rewind, or jump ahead/jump back commands without requiring additional bandwidth. Such features may also have much less latency, as well as support multiple levels of fast forward and rewind. For example, if the VOD video content is streamed at 2× or more speed from beginning and buffered in a interface device 26, a viewer may then be able to fast forward at a much higher frame rate, depending on how much is buffered. At the very least, a viewer can fast forward at a minimum of however fast the video content is being streamed to them. Further, they could rewind at nearly any speed since all the video content would be buffered. Some embodiments may avoid any need for special "trick play" streams to simulate fast forward or rewind, as previously described.

Figure 3:
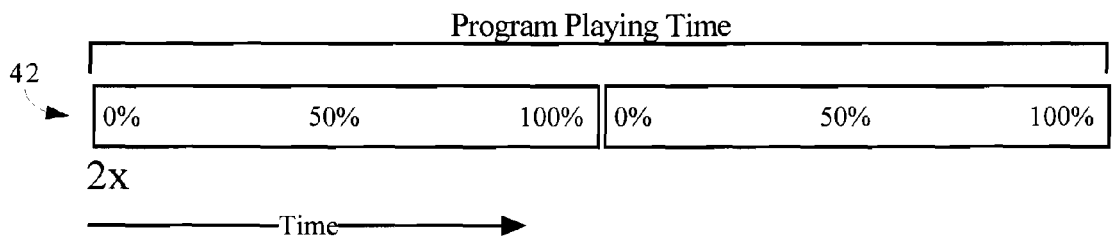

FIG. 3 illustrates an embodiment for broadcasting or streaming a single program at a higher speed. For this embodiment, a contiguous video program 42 is streamed at 2× the normal data rate. An embodiment may utilize twice the bandwidth for example by using two program blocks in a QAM. Although this example uses 2× speed, other higher or lower speeds are possible. After the stream has completed sending all of the data (which would take half the time) it may then start over and rebroadcast the same content.

If part of the linear content requested is not in the buffer 32, an embodiment may provide for a switched multicast stream that can be received by any device needing that section of content, as will be described in more detail below.

Embodiments disclosed herein provide other benefits besides those for the VOD aspect of digital video. Non-VOD (linear) content may also be broadcasted or streamed at 2× or faster speeds, and be buffered. This may provide benefits for viewers who wish to start a program over, but without for example opening a special VOD session to restart the program. Other benefits may include allowing viewers to watch "live" a scheduled broadcast program, but still fast forward through commercials. Further, multiple shows may be recorded on one tuner/decoder simultaneously. Embodiments disclosed herein include novel approaches on how to stream such video and media content. Buffering does not need to be contiguous. Further, by using switched multicast and/or more than one stream when a VOD session is required, a viewer can be transferred back to the linear stream sooner, and the VOD session discontinued, which could be used to save bandwidth.

Another advantage for embodiments disclosed herein is dual recording, whereby, for example, viewers can buffer an entire show. This is particularly effective using the 2× transmission speed where the user has tuned into the show before the show is half over. In one example of dual recording, the entire program is broadcast twice consecutively at 2× speed. This also has the advantage of letting users record two shows during the same time period with one tuner, since the entire show can be buffered in 50% of the show's length.

Some embodiments may provide for jump ahead-type features, which may, for example, allow users to jump ahead in the program instantly. This process is similar to fast forward, but is not contiguous. It allows users to skip portions of programming, such as commercials. A similar feature is the jump back feature, which allows users to instantly jump back in a broadcast. The jump back feature is similar to rewind but is not contiguous.

Figure 4:
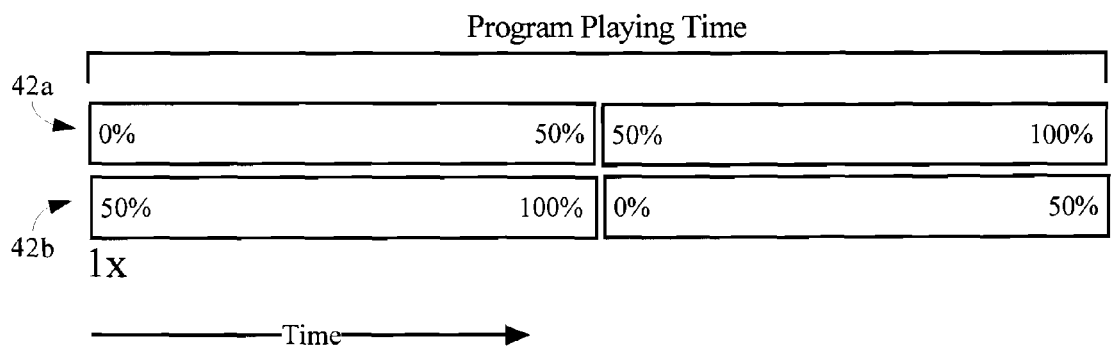

FIG. 4 illustrates an exemplary embodiment that utilizes two simultaneous streams running at 1× playback rate. A media program may be divided into two or more segments, and the segments streamed simultaneously on the multiple streams (or channels). For the embodiment shown in FIG. 4, a stream 42a starts at 0% and completes at 50% of the linear content, and the second stream 42b starts at 50% and completes at 100%. As a feature that aids backwards compatibility, the first stream 42a may go from 0% to 100% (normal streaming) and the second stream 42b may go from 50%-100%, then restart at 0% and complete at 50% (i.e. start at the second half of the content, stream to the end, and then stream from the beginning of the content until the half way point). In effect the same program (media content) is sent on two streams that are half way out of phase with each other. A larger number of streams may be used, with the content phased appropriately for the number of streams. A viewer tuning in may be automatically tuned (by the system) to view the stream appropriate for when the viewer started viewing. This embodiment, for example, allows viewers who just tuned in to fast forward or jump ahead in the program if it is less than 50% complete, or they can rewind or jump back if it is over 50% complete.

Figure 5:
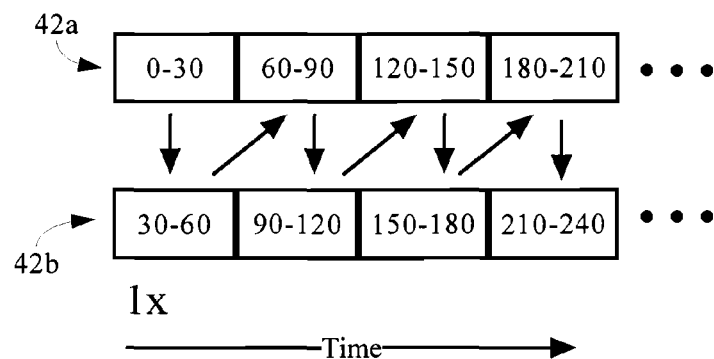

FIG. 5 illustrates an embodiment that utilizes two content streams 42 transmitting staggered segments of content. After both streams complete thirty seconds of content, they jump ahead thirty seconds of content from their respective end points. When a user first tunes in, he may start viewing the stream 42b, which is streaming "later" content. The user would then be switched to content in the buffer, as provided by both streams. This embodiment is helpful, for example, for viewers that are familiar with a feature of skipping forward in a program by jumping ahead 30 seconds. When a user tunes in, he can immediately jump back thirty seconds (by switching to stream 42a), in case he just missed something exciting. Once thirty seconds have passed he can then fast forward or jump ahead 30 seconds, as there would be at least that much content in the buffer. As more time passes the viewer can then fast forward or jump further ahead, because the buffer fills at 2× the rate of viewing. This embodiment may utilize, for example, any predetermined length of time for content segments and content stream phase, from a few seconds to several minutes. Further, the length of time may be varied during broadcast transmission. For example, if user behavior indicates that viewers just tuning in at certain times (such as on the hour or half hour) would prefer to be able to jump back two minutes, the time length segments may be adjusted accordingly for those times.

In preparing media content for streaming, an embodiment may perform operations to enable the interface device 26 to immediately decode media at the beginning of any 30 second segment. For example, with MPEG compressed video, the first frame of each 30 second segment may be an I-frame, which does not require any previous or subsequent frames in order to decode. Alternatively, the start and end positions of segments may be adjusted so that each segment starts with an I-frame, and the segments will be contiguous but may vary in length by a small amount of time.

This embodiment may enable such advantages as fast forward after a short time period (as previously described), an ability for dual recording, and an ability to jump forward or backward by a certain amount, for example. As previously described in an exemplary embodiment, viewers can immediately jump back 30 seconds upon tuning in, or any time after that, presuming that the past content is kept in the buffer. Further, if the video content loops (as previously described for other exemplary embodiments) the user can jump back to the beginning of the show when that content is in the buffer. Further, the surf bar shown in FIG. 9 may be modified to reflect the available content that is currently in the buffer.

Figure 6:
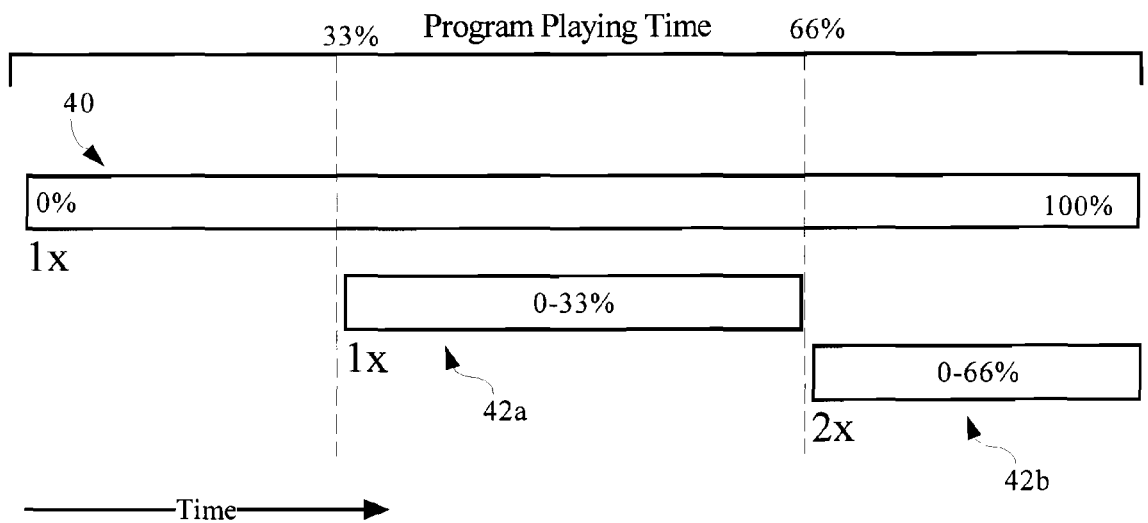

FIG. 6 illustrates an embodiment that, for example, may allow viewers tuning in at various times to start a program over. This embodiment includes a basic content stream 40 sent at 1×, for example. One or more secondary streams 42a, 42b may start at various times during transmission of the program stream 40, for example, when the stream, or program, is ⅓ over, and when it is ⅔ over (20 and 40 minutes into an hour long program). In this example, if a viewer tunes in at 20 minutes into the program the basic stream 40 will buffer the program from 20-60 minutes, and the secondary stream 42a that just started would buffer 0-20 minutes. Similarly if a viewer tunes in at 40 minutes, the basic stream 40 would buffer from 40-60 minutes, and the secondary stream 42b would buffer from 0-40 minutes. In this example, the secondary stream 42b may be streamed at, for example, a minimum rate of 2×, causing the total bandwidth of the channel to be, for example, 3× the normal bit rate. However, this is offset, for example, by the first 20 minutes requiring only 1× speed.

Further details for the exemplary embodiment illustrated in FIG. 6 will now be provided. Once the basic stream 40 is 33% complete, a secondary stream 42a starts at 1× speed. This stream 42a will stream the same content from 0%-33%. A viewer who tunes in after the program starts (but before the secondary stream 42a commences) can restart the program once the second stream 42a commences. The basic stream 40 continues and may be buffered for when the secondary stream 42a stops at 33% (which occurs when the program is 66% complete). Once the secondary stream 42a is completed, the basic stream 40 is 66% complete, in this example. Another secondary stream 42b is started when secondary stream 42a is completed. The secondary stream 42b streams content from 0%-66%, allowing a user who tuned in when the program was between 33%-66% complete, for example, to restart it. The secondary stream 42b may be streamed at 2× to complete 66% before the basic stream 40 completes its remaining 33% of the program content. In alternate embodiments, other multipliers may be used for each of the respective streams such as 2×/2×/4× or 4×/4×/8×.

An advantage of this embodiment is that the program content may be streamed in a standard fashion using the basic stream 40, and be accessible by various types of equipment and available at various provider's service levels. Additional secondary streams 42 may be limited to certain service levels that promote the ability for a viewer to start over, or other functions. This embodiment may also include variations in the starting time, data rates, or number of secondary streams 42, which may be adjusted and/or selected to best match general or specific viewer habits or provider requirements. Such parameters may also be adjusted, for example, based on available bandwidth, popularity of the program content or other parameters.

Some embodiments may include a feature of spawning a switched unicast or multicast VOD session to viewers who tune in to a program and wish to start over or rewind/fast forward to a part in the program that is not in their buffer. An embodiment may continue to buffer the program, but may use an additional tuner to spawn a special VOD session with a server that will broadcast the parts of the program that the viewer is attempting to watch. A feature of this embodiment for multicast streams is that other receivers (interface devices 26, FIG. 1, etc.) on the distribution network 24 may also be notified of the special VOD session. Such notification may comprise in band or out of band signaling, or by other data transmission methods. The notification may include identification of the program, identification of the portions to be broadcast, rate of data transmission, stream and/or channel identification and time the information will be broadcast. Other interface devices may determine, based input from a user or signal from another source, that they will also tune in to and buffer the extra content. The determination may be made based on one or more factors, including: if a receiver has a spare tuner; if the content is in the same QAM; whether the receiver is tuned to the program for which the extra content is not yet buffered; whether the viewer has a history of utilizing trick play features generally or for the specific program; etc. When the VOD session content stream reaches a point in the program wherein the content is in the buffer (from the original stream), the system 20 may commence providing video content from the buffer and close the VOD session. If other receivers indicate that they are also receiving the content of the special VOD session, then it may remain active even though the original requesting receiver is no longer using it. Interface devices or receivers may selectively tune in to only receive certain portions of the streamed or buffered content, based on the requested/required content and when that content portion will be streamed.

A server 30 according to one embodiment may include procedures for determining how to prepare a multicast stream of content based on requests from multiple interface devices. Requests for content from interface devices may include an urgency indication for how quickly the interface device requires the requested content. For example, a high urgency may indicate that a viewer is fast forwarding and the content is needed as soon as possible to support this operation. In another example, a low urgency may be indicated where the interface device requires some content to complete its buffer copy of the program, but the missing content is not immediately needed. Interface devices or servers may also use prediction processes to determine if some missing content may be required based on a viewer's activities, such as previous fast forwarding through commercials. The server 30 may prepare a content stream to satisfy requirements from multiple interface device requests, including ordering the stream sequence to prioritize content based on urgency indications.

Figure 7:
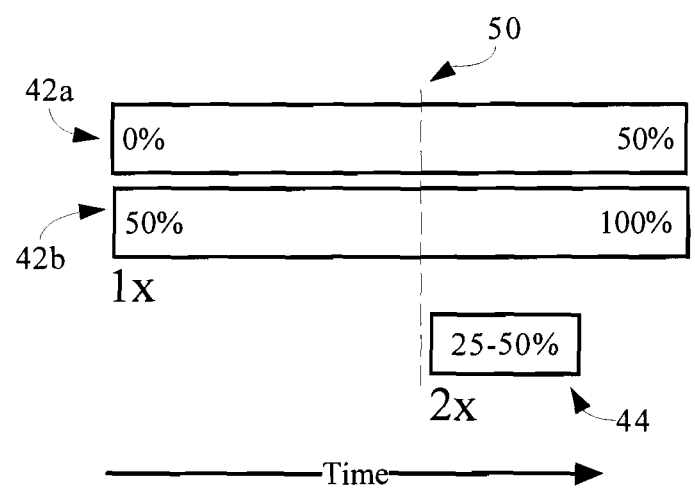

FIG. 7 illustrates another exemplary embodiment having two content streams 42 for streaming a single program. Both content streams 42 are streamed linearly at 1× speed, with the first stream 42a streaming 0-50% and the second stream 42b streaming 50-100% of content. As an example, consider a viewer who starts watching a one hour long program at its scheduled start time. After 15 minutes the viewer wishes to fast forward to the time indicated by line 50. Since, in this example, both streams 42*a* and 42*b* are streamed at 1× speed, the viewer would only have 0-25% and 50-75% of the program content in the buffer of his interface device. According to the embodiment, the system would send a separate multicast stream 44 to the interface device. The stream 44 would start at 25% and go to 50% of the content, thereby providing the required content. The stream 44 may be broadcast at a speed greater than 1×, to facilitate features such as fast forwarding. Once the stream 44 is 50% complete, it may be stopped, since the interface device would have buffered the content from the stream 42*b*, which started at 50%. Alternatively, the stream 44 may continue, since other interface devices on a network may be receiving and buffering content.

Embodiments disclosed herein may support backwards compatibility with current systems in that a regular 1× stream is transmitted, and when a separate content stream is sent at greater than 1× speed, it may be sent on a different program (channel) number, so that a non-buffering interface device can continue to play the live 1× stream and ignore the streams on other channels. This feature may require only a single tuner if the streams used for a single program are sent through the same QAM device.

The described embodiments may be combined in various ways to define a set of features most advantageous for specific networks, receivers, viewers, audiences, and types of program. Also, as previously described, certain features may be utilized or emphasized for certain parts of a program content broadcast.

Figure 8:
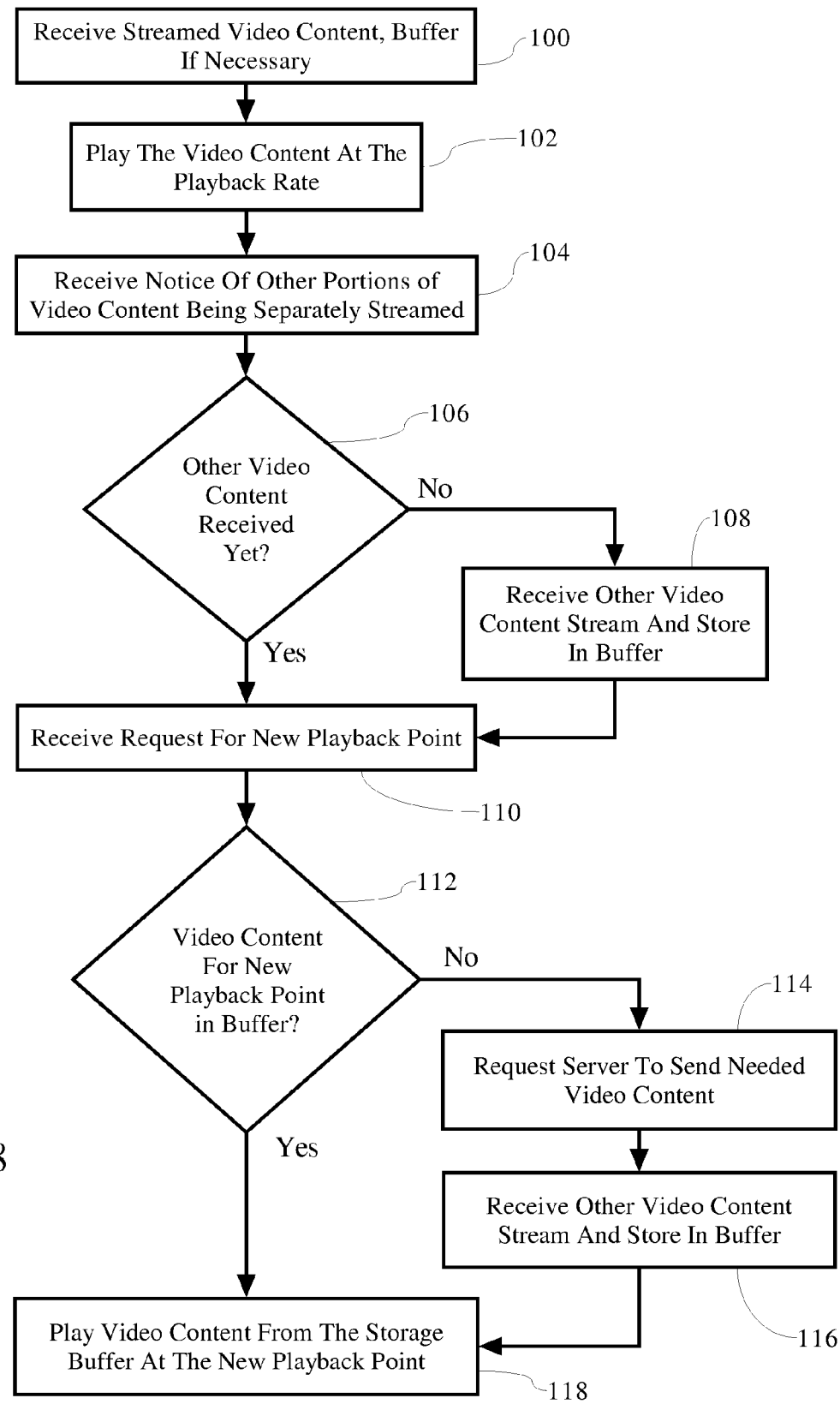
FIG. 8 illustrates an exemplary method which may be implemented by one or more embodiments.

FIG. 8 illustrates a method according to one or more embodiments disclosed herein. Streaming video or media content such as broadcast television is received, as shown in step 100. This video content may be streamed at a standard playback rate, or at a higher rate, as previously described. If sent at a higher rate, the extra video content will be buffered, and playback will be from the buffer. The receiving unit provides the video content for playback, at the proper playback rate, as shown in step 102. For example, a receiving unit, such as an interface device for example, decodes the video content, and provides a signal to a television set for viewing. At some point during the playback, a message may be sent to one, some or all interface devices on a network that a separate multicast stream is being sent with other portions of the video content, as shown in step 104. This may happen, for example, because another interface device on a network issued a request for the other portions of the video content. These other portions may include content already streamed or additional content from the program that has yet to be streamed. If the interface device already has the additional content in its buffer, then it would take no action, as shown in step 106. However, if it does not have this content, it may select to receive this new stream of video content, and store it in a buffer, as shown in step 108. Some applications of the disclosed embodiments may enable choosing whether to receive this related content based on certain conditions, for example: amount of storage available; amount of time remaining in a program; historic habits of users of the interface device for rewinding or fast forwarding; etc. The steps 106 and 108 may not occur at all during playback of a program, or they may occur multiple times.

At some point during the playback, a request may be received from a user of the interface device for a trick play operation, as shown in step 110. An embodiment may be configured to enable use of buffered video content for the trick play operation, whether it is fast forwarding, rewinding, jumping forwards or backwards, or starting over, for example. The embodiment may enable a check as to whether the video content for such trick play operations is already in the storage buffer, as shown in step 112. If it is, then the operations may be performed using the stored content, as shown in step 118. If the video content is not yet buffered, a request may be sent to the server for the required video content, as shown in step 114. The server may then establishe a separate VOD stream to provide the required video content, and the interface device receives this video content and plays it back as required, as well as storing it in the buffer as needed, as shown in step 116. If the separate VOD stream is a multicast stream, then other interface devices may receive the stream, and depending upon the status of the interface devices, they may also buffer the video content. In the exemplary embodiment of FIG. 8, steps 108 and 116 are similar; one difference is that for step 108, the additional video content is streamed because of a request by another interface device on the network, while a particular interface device may not need the extra video content, but has the opportunity to buffer it anyway. For step 116, the interface device needs the extra video content, and has specifically requested it from a server.

At the end of the program, or when the viewer switches off the receiver, the buffer may be cleared of all buffered video content. Alternatively, the viewer may be given the option to save the program.

The central system 22 may be configured to be responsive to requests for certain video content, wherein the request may include a time-defined portion for the requested content. The central system may then be configured to create a new temporary stream, and transmit the requested content. The central system 22 may also send a separate message to all receivers identifying the content, so that receivers may determine whether they will buffer the content. Certain portions of content may be prepared in advance of the program transmission, based on likelihood that such portions will be requested by typical user's trick play actions. For example a content segment from the beginning of the program may be readily available for immediate streaming, since many viewers tuning in late may wish to rewind to see the beginning of the program.

Although exemplary embodiments have been described in terms of television program broadcast over a cable network, embodiments disclosed herein may be utilized for any type of streamed content, including audio and video; and any type of content delivery system, including RF transmission, wireless broadcast, wireless networks, internet protocols, etc.

One or more aspects of the disclosures may be embodied in computer-usable data and computer-executable instructions, such as in one or more program modules, executed by one or more computers, processors, or other devices. Generally, program modules include routines, programs, objects, components, data structures, etc., that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Embodiments may be implemented in software to be provided to existing central system systems and servers, and to interface devices and DVRs. Further, embodiments may be embedded in the hardware or firmware of new equipment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method comprising:
receiving streamed media content that is streamed over a transmission network;
receiving, by a computing device, information regarding a first multicast stream, the first multicast stream comprising trick play content related to the streamed media content;
determining if the trick play content is related to the streamed media content;
while receiving the streamed media content, determining whether to receive the first multicast stream based on whether a local buffer includes the trick play content; and
declining to receive the first multicast stream if the local buffer includes the trick play content.

2. The method of claim 1, further comprising:
receiving second information regarding a second multicast stream; and
declining to store data of the second multicast stream in the local buffer if the second multicast stream is related to content different from the streamed media content,
wherein receiving the information regarding the first multicast stream comprises receiving the information irrespective of any request for the information from the computing device.

3. The method of claim 1, further comprising:
storing the streamed media content in the local buffer; and
storing the trick play content in the local buffer if the first multicast stream is received,
wherein receiving the streamed media content comprises receiving the streamed media content at a rate greater than a playback rate of the streamed media content.

4. The method of claim 1 wherein receiving the streamed media content comprises receiving the streamed media content in a plurality of content streams, each of the plurality of content streams providing a different segment of the streamed media content.

5. The method of claim 1, further comprising:
upon receiving a first request to change playback of the streamed media content to a different playback point, determining if a corresponding portion of the streamed media content for the different playback point is available in the local buffer;
if the corresponding portion of the streamed media content for the different playback point is different from each portion available in the local buffer, transmitting a second request over the transmission network for second trick play content for the different playback point;
if the corresponding portion of the streamed media content for the different playback point is different from each portion available in the local buffer, receiving a second multicast stream comprising the second trick play content over the transmission network, at a rate greater than a playback rate for the streamed media content; and
if the corresponding portion of the streamed media content for the different playback point is different from each portion available in the local buffer, storing the second trick play content in the local buffer,
wherein the second request for the second trick play content comprises an urgency indication specifying how quickly the second trick play content is required.

6. The method of claim 5, further comprising:
prior to transmitting the second request over the transmission network for the second trick play content, determining that the second trick play content is required based on viewer activity.

7. The method of claim 1, wherein the determining whether to receive the first multicast stream comprises determining whether to receive the first multicast stream comprising including the trick play content further based on an amount of storage available in the local buffer.

8. The method of claim 1, wherein the determining whether to receive the first multicast stream comprises determining whether to receive the first multicast stream comprising including the trick play content further based on an amount of time remaining in a program corresponding to the streamed media content.

9. The method of claim 1, wherein the trick play content comprises content for performing one of fast forwarding, rewinding, jumping forward, jumping backward, and starting over.

10. An apparatus, comprising:
at least one processor; and
memory storing computer-readable instructions that, when executed by the at least one processor, cause the apparatus to:
receive a first segment of media content streamed over a transmission network; receive information regarding a multicast stream;
determine if the multicast stream includes a second segment of the media content;
while receiving the first segment of the media content, determine whether to receive the multicast stream based on whether a local buffer includes the second segment; and
decline to receive the first multicast stream if the local buffer includes the second segment.

11. The apparatus of claim 10, wherein the memory stores additional computer-readable instructions that, when executed by the at least one processor, further cause the apparatus to:
ignore the multicast stream if each of its segments is related to content different from the media content,
wherein the multicast stream comprising the second segment is transmitted over the transmission network in response to a request from another apparatus different from the apparatus.

12. The apparatus of claim 10, wherein the first segment of the media content streamed over the transmission network is received at a rate greater than a playback rate of the media content, and wherein the memory stores additional computer-readable instructions that, when executed by the at least one processor, further cause the apparatus to:
store the first segment of the media content in the local buffer; and
store the second segment of the media content in the local buffer if the multicast stream is received.

13. The apparatus of claim 10, wherein the first segment covers a first period of time of the media content that is different from a second period of time that the second segment covers.

14. The apparatus of claim 10, wherein the memory stores additional computer-readable instructions that, when executed by the at least one processor, further cause the apparatus to:
- upon receiving a first request to change playback of the media content to a different playback point, determine if a corresponding portion of the media content for the different playback point is available in the local buffer;
- if the corresponding portion of the media content for the different playback point is different from each portion available in the local buffer, transmit a second request over the transmission network for a third segment of the media content comprising the different playback point;
- if the corresponding portion of the media content for the different playback point is different from each portion available in the local buffer, receive another multicast stream comprising the third segment of the streamed media content over the transmission network at a rate greater than a playback rate for the media content; and
- if the corresponding portion of the media content for the different playback point is different from each portion available in the local buffer, store the third segment of the media content in the local buffer,
- wherein the second request for the third segment of the media content comprises an urgency indication specifying how quickly the third segment is required.

15. The apparatus of claim 14, wherein the memory stores additional computer-readable instructions that, when executed by the at least one processor, further cause the apparatus to:
- prior to transmitting the second request over the transmission network for the third segment of the media content, determine that the third segment is required based on viewer activity.

16. The apparatus of claim 10, wherein the determining whether to receive the multicast stream comprises determining whether to receive the multicast stream comprising the second segment further based on an amount of storage available in the local buffer.

17. The apparatus of claim 10, wherein the determining whether to receive the multicast stream comprises determining whether to receive the multicast stream comprising the second segment further based on an amount of time remaining in a program corresponding to the streamed media content.

18. A method, comprising:
- receiving first content;
- receiving, by a computing device, information regarding a first multicast stream, the first multicast stream comprising second content related to the first content;
- determining if the second content is related to the first content;
- while receiving the first content, determining whether to receive the first multicast stream based on whether a local buffer includes the second content; and
- declining to receive the first multicast stream if the local buffer includes the second content.

19. The method of claim 18, further comprising:
- receiving second information regarding a second multicast stream; and
- declining to store data of the second multicast stream in the local buffer if the second multicast stream is related to content different from the first content.

20. The method of claim 18, wherein the first content is streamed at a rate greater than a playback rate of the first content, and wherein the method further comprises:
- storing the first content in the local buffer; and
- storing the second content in the local buffer if the first multicast stream is received.

21. The method of claim 18, further comprising:
- upon receiving a first request to change playback of the first content to a different playback point, determining if a corresponding portion of the first content for the different playback point is available in the local buffer;
- if the corresponding portion of the first content for the different playback point is different from each portion available in the local buffer, transmitting a second request for third content for the different playback point;
- if the corresponding portion of the first content for the different playback point is different from each portion available in the local buffer, receiving a second multicast stream comprising the third content at a rate greater than a playback rate of the first content; and
- if the corresponding portion of the first content for the different playback point is different from each portion available in the local buffer, storing the third content in the local buffer,
- wherein receiving the first content comprises receiving the first content in a plurality of content streams, each of the plurality of content streams providing a different segment of the first content.

* * * * *

UNITED STATES PATENT AND TRADEMARK OFFICE
CERTIFICATE OF CORRECTION

PATENT NO.         : 8,782,267 B2  
APPLICATION NO.    : 12/474796  
DATED              : July 15, 2014  
INVENTOR(S)        : Ross Gilson Page 1 of 1

It is certified that error appears in the above-identified patent and that said Letters Patent is hereby corrected as shown below:

Claims

Column 17, Claim 5, Line 64:
 Delete the "," after "network" thereby changing "network," to --network--

Column 18, Claim 7, Line 14:
 Before "the", delete "including"

Column 18, Claim 8, Line 19:
 Before "the", delete "including"

Column 18, Claim 10, Line 32:
 "receive information" should begin on a new line

Column 18, Claim 10, Line 40:
 Before "multicast", delete "first"

Signed and Sealed this
Tenth Day of November, 2015

Michelle K. Lee
*Director of the United States Patent and Trademark Office*